United States Patent
Schempp

(10) Patent No.: US 11,852,733 B2
(45) Date of Patent: Dec. 26, 2023

(54) METHOD FOR THE GENERATION OF SATELLITE CLOCK AND ORBIT CORRECTIONS FOR GLOBAL NAVIGATION SATELLITE SYSTEMS (GNSS)

(71) Applicant: Raytheon Company, Waltham, MA (US)

(72) Inventor: Timothy R. Schempp, Fullerton, CA (US)

(73) Assignee: Raytheon Company, Waltham, MA (US)

( * ) Notice: Subject to any disclaimer, the term of this patent is extended or adjusted under 35 U.S.C. 154(b) by 479 days.

(21) Appl. No.: 17/197,186

(22) Filed: Mar. 10, 2021

(65) Prior Publication Data

US 2022/0291392 A1    Sep. 15, 2022

(51) Int. Cl.
| | | |
|---|---|---|
| *G01S 19/07* | (2010.01) | |
| *B64G 1/24* | (2006.01) | |
| *G06F 1/12* | (2006.01) | |

(52) U.S. Cl.
CPC .......... *G01S 19/071* (2019.08); *B64G 1/242* (2013.01); *G06F 1/12* (2013.01)

(58) Field of Classification Search
CPC .......... G01S 19/071; B64G 1/242; G06F 1/12
USPC ................................... 342/357.39
See application file for complete search history.

(56) References Cited

U.S. PATENT DOCUMENTS

2016/0025860 A1    1/2016   Wengler et al.

FOREIGN PATENT DOCUMENTS

| | | | | |
|---|---|---|---|---|
| AU | 2011360286 | | 9/2013 | |
| CN | 104614738 | | 5/2015 | |
| CN | 106042249 | | 10/2016 | |
| CN | 106468774 A | * | 3/2017 | ............. G01S 19/30 |
| CN | 107209269 A | * | 9/2017 | ............. G01S 19/08 |
| EP | 0185274 | | 6/1986 | |
| EP | 3525009 | | 8/2019 | |
| WO | 2012114620 | | 8/2012 | |
| WO | WO-2019117401 A1 | * | 6/2019 | ............. G01S 19/07 |
| WO | WO-2022164580 A1 | * | 8/2022 | ............. G01S 19/071 |

OTHER PUBLICATIONS

International Search Report and Written Opinion dated Apr. 7, 2022 in corresponding International Application No. PCT/US2021/064324.

* cited by examiner

*Primary Examiner* — Harry K Liu
(74) *Attorney, Agent, or Firm* — Renner, Otto, Boisselle, & Sklar

(57) ABSTRACT

A system and method are provided for delivering orbit and clock corrections for Global Navigation Satellite Systems (GNSS) having: (1) reduced orbit and clock discontinuities when changes in ephemeris message from a satellite occur; (2) reduced quantization error by quantifying quantization error by fitting data within the constraints of the output message to prevent broadcast of large errors; and (3) reduced potential errors caused by old but active data.

20 Claims, 6 Drawing Sheets

METHOD FOR THE GENERATION OF SATELLITE CLOCK AND ORBIT CORRECTIONS FOR GLOBAL NAVIGATION SATELLITE SYSTEMS (GNSS)

FIELD OF INVENTION

The present disclosure relates generally to global positioning systems and more particularly to the generation of orbit and clock corrections for Global Navigation Satellite Systems (GNSS).

BACKGROUND

The Wide Area Augmentation System (WAAS) enhances the Global Positioning System (GPS) standard positioning service by providing sufficient integrity, accuracy, availability and continuity for use in commercial aviation. WAAS provides en-route through non-precision approach, Lateral NAVigation/Vertical NAVigation (LNAV/VNAV), and Localizer Performance with Vertical guidance (LPV) approach capabilities. Since WAAS is compliant with the same international standards used to build Japan's MTSAT Satellite-based Augmentation System (MSAS) and Europe's European Geostationary Navigation Overlay Service (EGNOS) system along with several other systems under development, a WAAS enabled GPS receiver will improve the accuracy, integrity and availability of GPS for user's around the world.

WAAS is a differential GPS system that processes measurements from reference stations throughout North America to compute ionospheric corrections and satellite orbit and clock corrections. GPS measurements are processed by a network of Wide Area Reference Stations (WRSs) located throughout the COTerminous United States (CONUS), Alaska, Puerto Rico, Hawaii, Mexico and Canada.

WAAS provides ionospheric corrections with reference receivers measuring signal quality data. The WAAS message is output to the Geo Uplink System (GUS). The GUS chooses data from one of the WMSs and uploads the data to a geo-stationary WAAS satellite, which broadcast the data to users.

SUMMARY

Next generation Global Navigation Satellite System (GNSS) satellites from the US and other countries are currently being launched. The Dual Frequency Multi-Constellation (DFMC) Satellite Based Augmentation System (SBAS) will track multiple constellations of GNSS satellites. SBAS systems will require a new algorithm to generate and broadcast orbit and clock corrections for DFMC users.

In a general embodiment, the present disclosure provides a system and method for providing orbit and clock corrections for Global Navigation Satellite Systems (GNSS) having: (1) reduced orbit and clock discontinuities when changes in ephemeris message from a satellite occur; (2) reduced quantization error by quantifying quantization error by fitting data within the constraints of the output message to prevent broadcast of large errors; and (3) reduced potential errors caused by old but active data.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
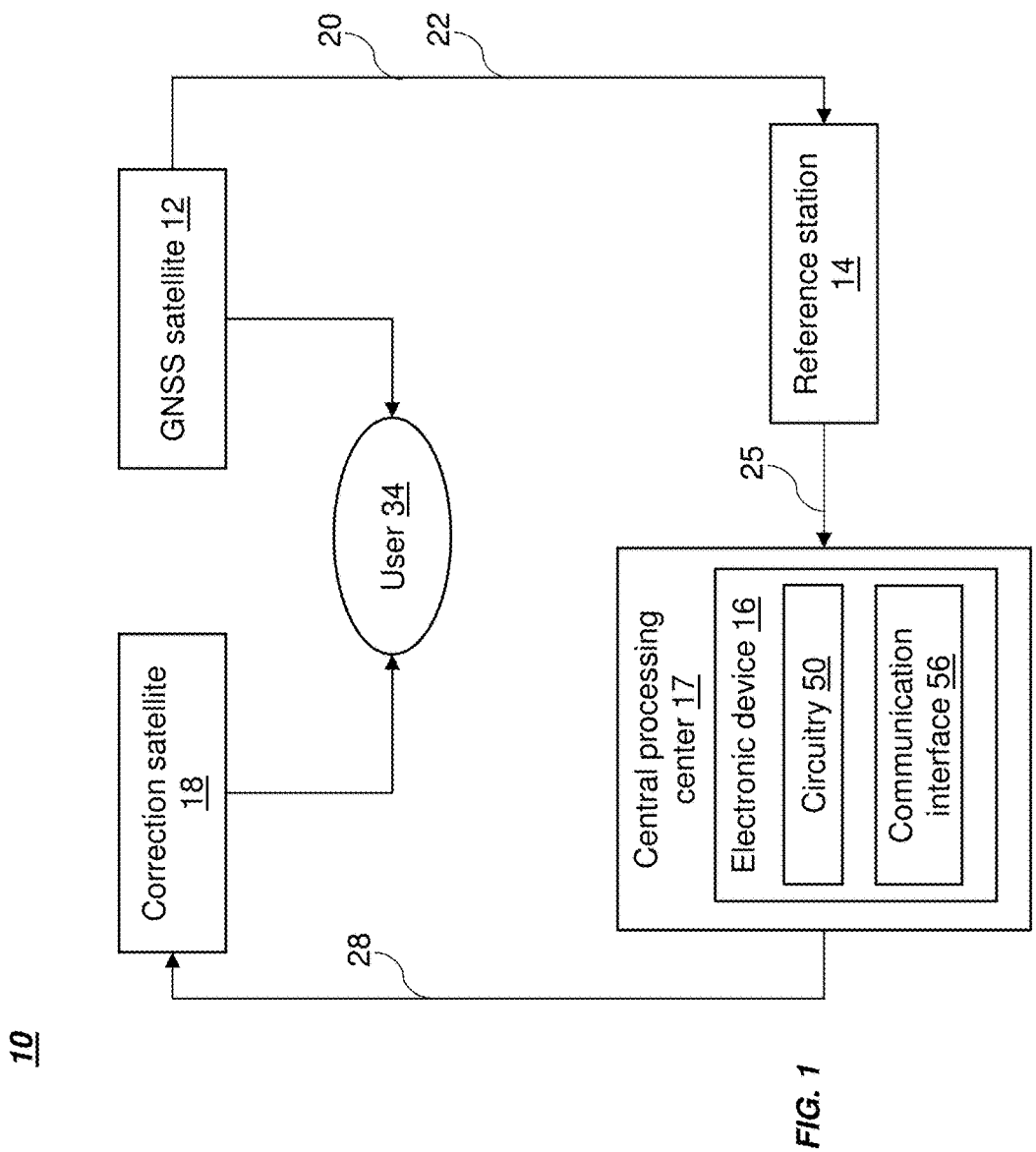
FIG. 1 is a block diagram of a system for providing corrections for a Global Navigation Satellite System (GNSS).

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

Satellite Based Augmentation Systems (SBASs) such as the currently deployed Wide Area Augmentation System (WAAS) and the future Dual Frequency Multi-Constellation (DFMC) systems use a network of reference stations throughout a country or continent to collect GNSS measurements. The measurements are sent to a central processing center and combined in a Kalman Filter to compute real time precise (<1 meter) estimates of the orbital position and clock offset for the satellites. The satellites broadcast their own orbit and clock information in the ephemeris. The difference between the estimated orbit and clock and the ephemeris computed orbit and clock is the correction. An SBAS system broadcasts these corrections.

The present disclosure provides a system and method for providing improved corrections that extrapolate forward in time to determine differences between extrapolated orbit and clock information that is differenced with the ephemeris orbit and clock to form corrections. Error checking is also employed to prevent situations where quantization error (rounding to fit in the message) causes large errors. Further, checks are implemented to compare new correction data to versions of old but active correction data to detect potential conflicts that could create a hazard for a user who missed a broadcast message.

In the embodiment shown in FIG. 1, a Global Navigation Satellite System (GNSS) 10 is shown including Global Navigation Satellite System (GNSS) satellite(s) 12, reference station(s) 14, an electronic device 16, and a correction satellite 18. As shown, the electronic device 16 may be included in a central process center 17. The GNSS satellite 12 outputs ranging data 20 and the assumed satellite location and clock 22 that is received by the reference station 14. Using the ranging data 20, the reference station 14 computes the estimated range 25 to the satellite and forwards the assumed satellite location and clock 22 and the range 25 to the central processing center 17. For example, the GNSS satellite 12 may output the assumed location 22. The electronic device receives the assumed location 22 and the computed range 25 from a plethora of reference stations 14 to calculate the coordinates of an actual location 24 for the GNSS satellite 12.

Figure 2:
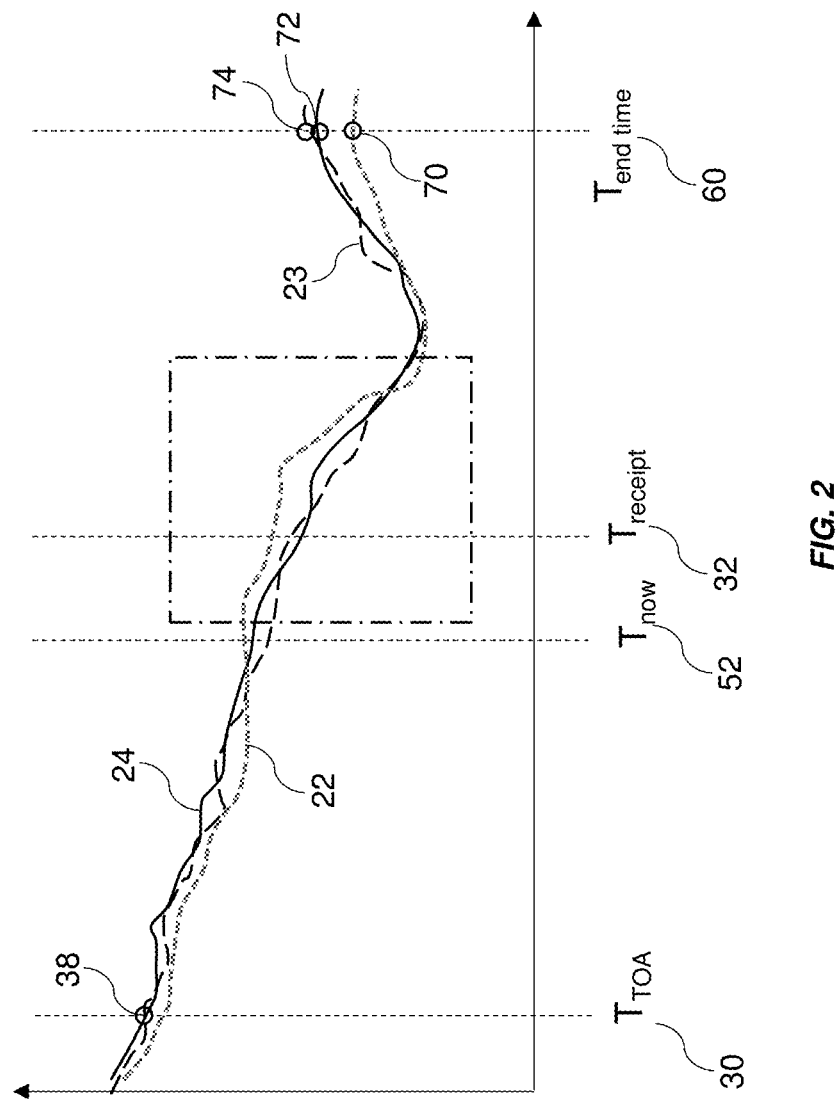
FIG. 2 is an exemplary plot in time of the X,Y or Z coordinate of an assumed location, an actual location, and a corrected location of a GNSS satellite from FIG. 1.
Figure 3:
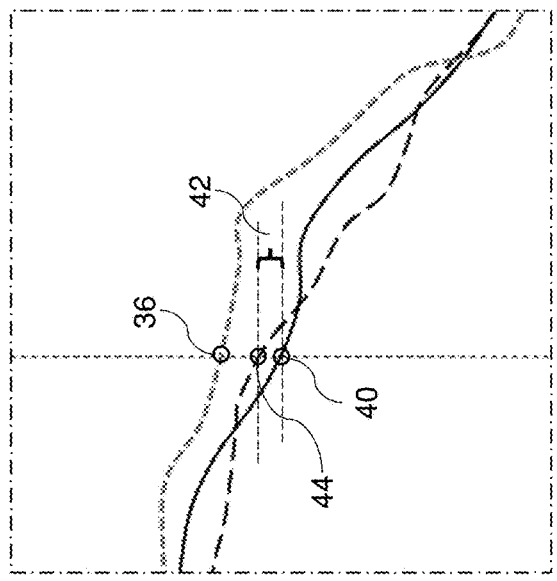
FIG. 3 is a zoomed in view of a portion of FIG. 2.

Turning to FIGS. 2 and 3, for each of the GNSS satellites 12 the electronic device 16 generates a set of correction data 28 based on an error between the X,Y or Z component of the assumed location 22 (shown as a gray dashed line) and the calculated location 24 (shown as a solid black line). The electronic device 16 generates the set of correction data 28 by setting a time of applicability (TOA) 30 of the set of the correction data 28 and estimating a receipt time 32 of the set of the correction data 28 by a user 34. The electronic device 16 determines a projected assumed location 36 of the GNSS satellite 12 at the receipt time 32. The electronic device 16 also determines a projected calculated location 40 of the GNSS satellite at the receipt time 32.

The electronic device 16 determines the set of the correction data 28, such that the error 42 is minimized when the set of the correction data 28 is quantized and applied to the projected assumed location 36 at the receipt time 32 to generate a projected corrected location 44. Applying the quantized set of the correction data to the projected assumed location 36 results in the corrected location 23. The error 42 is based on a difference between the projected corrected location 44 at the receipt time 32 and the projected actual location 40 at the receipt time 32. The set of correction data 28 is output to the correction satellite 18, which outputs the set of the correction data 28 for each of the GNSS satellites 12.

For example, FIG. 3 is a zoomed in view of the portion of FIG. 2 surrounded with a dashed-dotted box. In this example, the error 42 is an absolute value of a difference between the projected assumed location 36 and the projected actual location 40 at the receipt time 32.

The projected assumed location at the receipt time, the projected assumed location at the TOA, the projected calculated location at the receipt time, and the projected corrected location at the receipt time may each include both time and position data. For example, the position data may include x, y, and z coordinates. The time and position data may both have units of meters.

Figure 4:
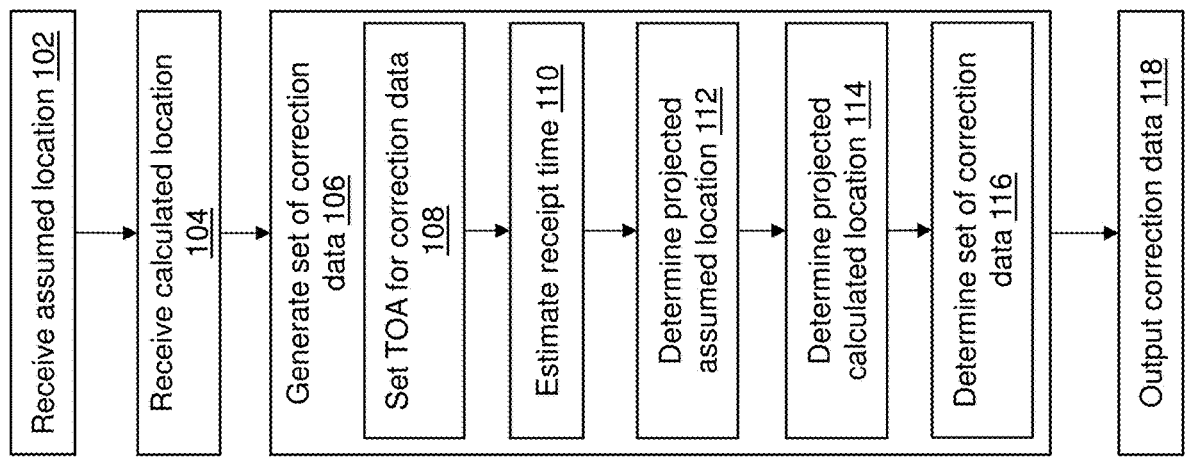
FIG. 4 is a block diagram of a method performed using circuitry for providing corrections for a GNSS satellite.

In the embodiment shown in FIG. 4, a method 100 performed using circuitry 50 for providing corrections for the GNSS 10 is shown. In process block 102, an assumed location and clock 22 of GNSS satellite 12 is received. In process block 104, a calculated location and clock 24 of the GNSS satellite is computed using the range data 25. In process block 106, a set of correction data 28 is generated based on an error between the assumed location 22 and the calculated location 24 of the GNSS satellite. The generating of the set of correction data 28 in process block 106 includes numerous sub-process blocks.

In sub-process block 108, a time of applicability (TOA) is set for the set of the correction data 28. In sub-process block 110, a receipt time 32 is estimated for receipt by the user 30 of the set of the correction data 28. For example, the TOA may be a set predetermined parameter (e.g., 36 seconds). The receipt time 32 may be determined based on (1) a current time 52 and (2) an estimate for the total time needed to calculate the set of correction data 28, to send the set of correction data 28 to the correction satellite 18, and to broadcast the set of correction data 28 to the user 34. In one embodiment, the receipt time 32 may be a predefined value from the current time 52.

In sub-process block 112, a projected assumed location and clock 36 is determined for the GNSS satellite at the receipt time 32. Similarly, in sub-process block 114, a projected calculated location and clock 40 of the GNSS satellite at the receipt time 32 is determined. Finally, in sub-process block 116, the set of the correction data is determined, such that the error 42 is minimized when the set of the correction data is quantized and applied to the projected assumed location 36 at the receipt time 32 to generate a projected corrected location 44 at the receipt time 32. As described above, the error 42 is based on a difference between the projected corrected location 36 at the receipt time 32 and the projected calculated location 44 at the receipt time 32. In process block 118, the set of the correction data 28 is output.

The electronic device 16 includes circuitry 50 and a communication interface 56. The communication interface 56 receives the assumed location 22 and the range data 25 of the GNSS satellites 12. The communication interface 56 may comprise a wireless network adaptor, an Ethernet network card, or any suitable device that provides an interface to a network. The communication interface 56 may be communicatively coupled to the computer readable medium, such that the communication interface 56 is able to send data stored on the computer readable medium across the network and store received data on the computer readable medium 56. The communication interface 56 may also be communicatively coupled to the circuitry such that the circuitry is able to control operation of the communication interface 56. The communication interface 56, computer readable medium, and circuitry may be communicatively coupled through a system bus, mother board, or using any other suitable manner as will be understood by one of ordinary skill in the art.

The circuitry 50 may have various implementations. For example, the circuitry 50 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 50 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 50. The circuitry 50 may be communicatively coupled to the computer readable medium and network interface through a system bus, mother board, or using any other suitable structure known in the art.

In the embodiment shown in FIG. 2, the circuitry 50 of the electronic device 16 (in addition to generating the set of correction data 28) determines an end time 60 of the set of the correction data 28. The circuitry 50 also determines a projected assumed location 70 at the end time 60 and a projected calculated location 72 of the GPS satellite at the end time 60. The circuitry 50 additionally determines a projected corrected location 74 at the end time 60 by quantizing the set of the correction data 28 and applying the quantized set of the correction data to the projected assumed location 70 at the end time. In this embodiment, the error 42 may also be based on a difference between the projected corrected location 74 at the end time 60 and the projected calculated location 72 at the end time 60. That is, the error 42 may be based on both (1) a difference between the projected corrected location 44 at the receipt time 32 and the projected calculated location 40 at the receipt time 32 and (2) the difference between the between the projected corrected location 74 at the end time 60 and the projected calculated location 72 at the end time 60. For example, the set of correction data 28 may be chosen to minimize the sum of the absolute value of these differences.

Figure 5:
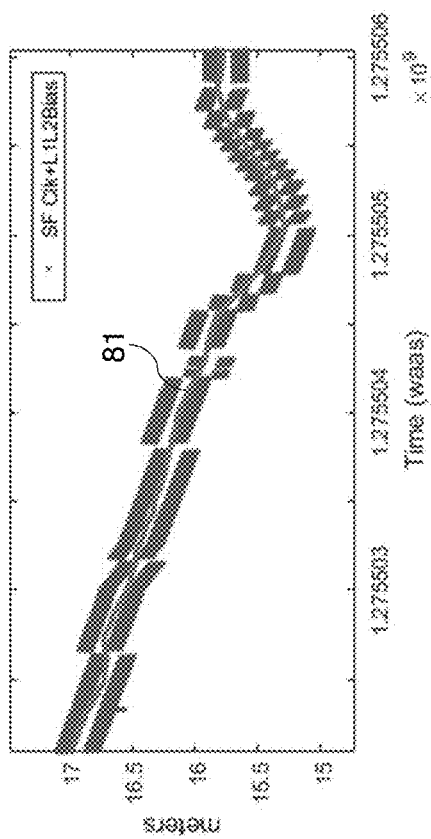
FIG. 5 is an exemplary plot in time of an orbit or clock correction.
Figure 6:
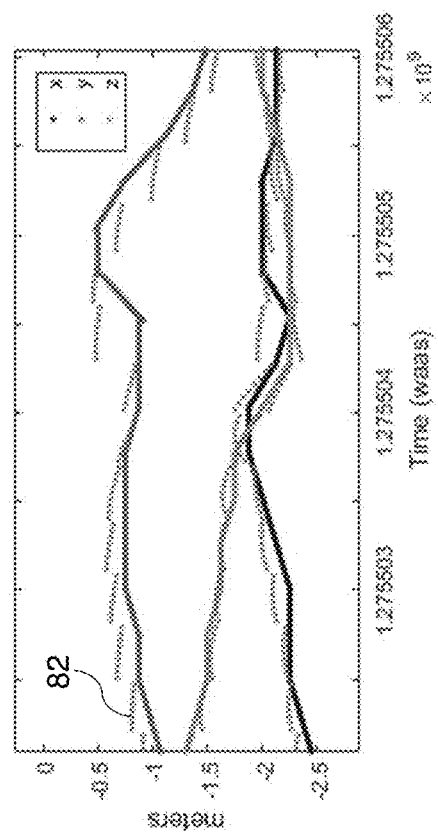
FIG. 6 is an exemplary plot in time of a clock correction performed using known techniques.
Figure 7:
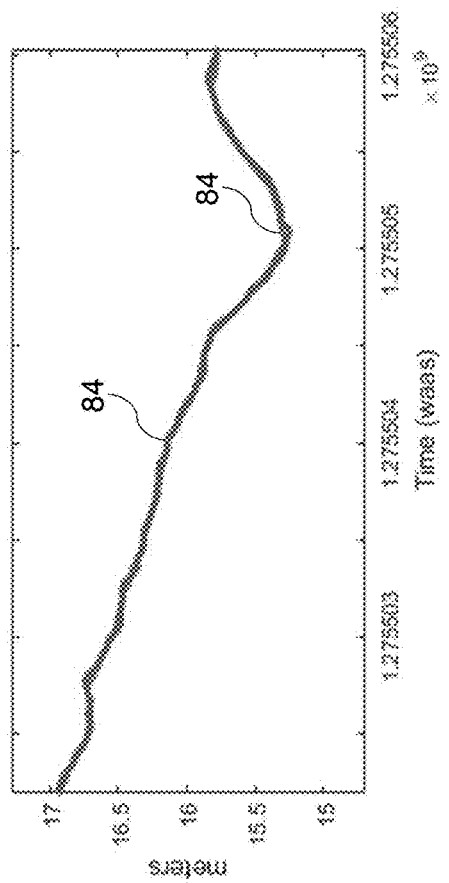
FIG. 7 is an exemplary plot in time of an orbit correction.
Figure 8:
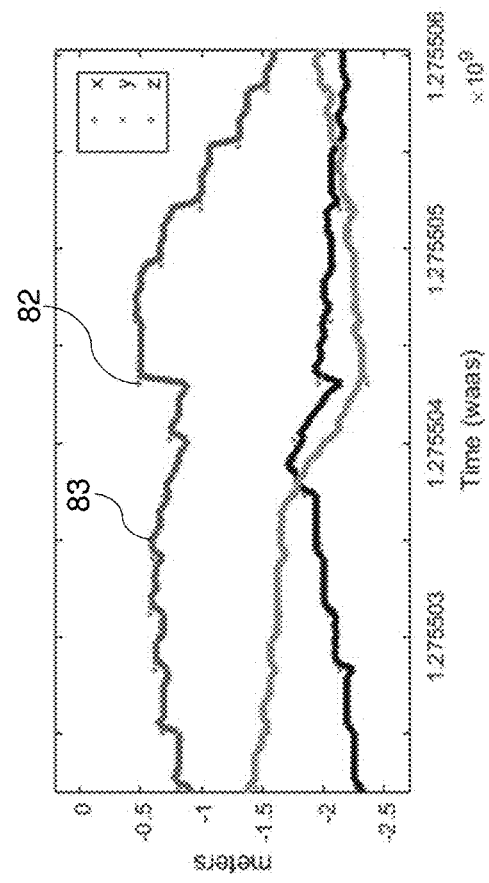
FIG. 8 is an exemplary plot in time of an orbit correction performed using known techniques.

As shown in FIGS. 5 and 7, the set of the correction data 28 may include an orbit correction 83 and a clock correction 84. FIG. 5 shows a clock correction 84 and the difference between the calculated clock 24 and the assumed clock 22. Similarly, FIG. 7 shows a correction of orbit position including x, y, and z and the difference between the calculated location 24 and the assumed location 22. FIGS. 6 and 8 show the corrections of the same data using alternative methods. In FIGS. 6 and 8, the corrections were not as effective, and the difference between the corrections and the original data (i.e. the error 42) is apparent as the original data gray dots or lines are visible. Conversely, in FIGS. 5 and 7, the difference between the corrections and the original data (i.e. the error 42) is difficult to discern.

When the set of correction data 28 is output it is quantized, such that both the orbit correction 83 and the clock correction 84 are quantized and have a limited resolution. For example, the set of correction data 28 may be quantized, such that the set of correction data 28 includes a limited number of digits (e.g., two) to the right of the decimal.

Figure 9:
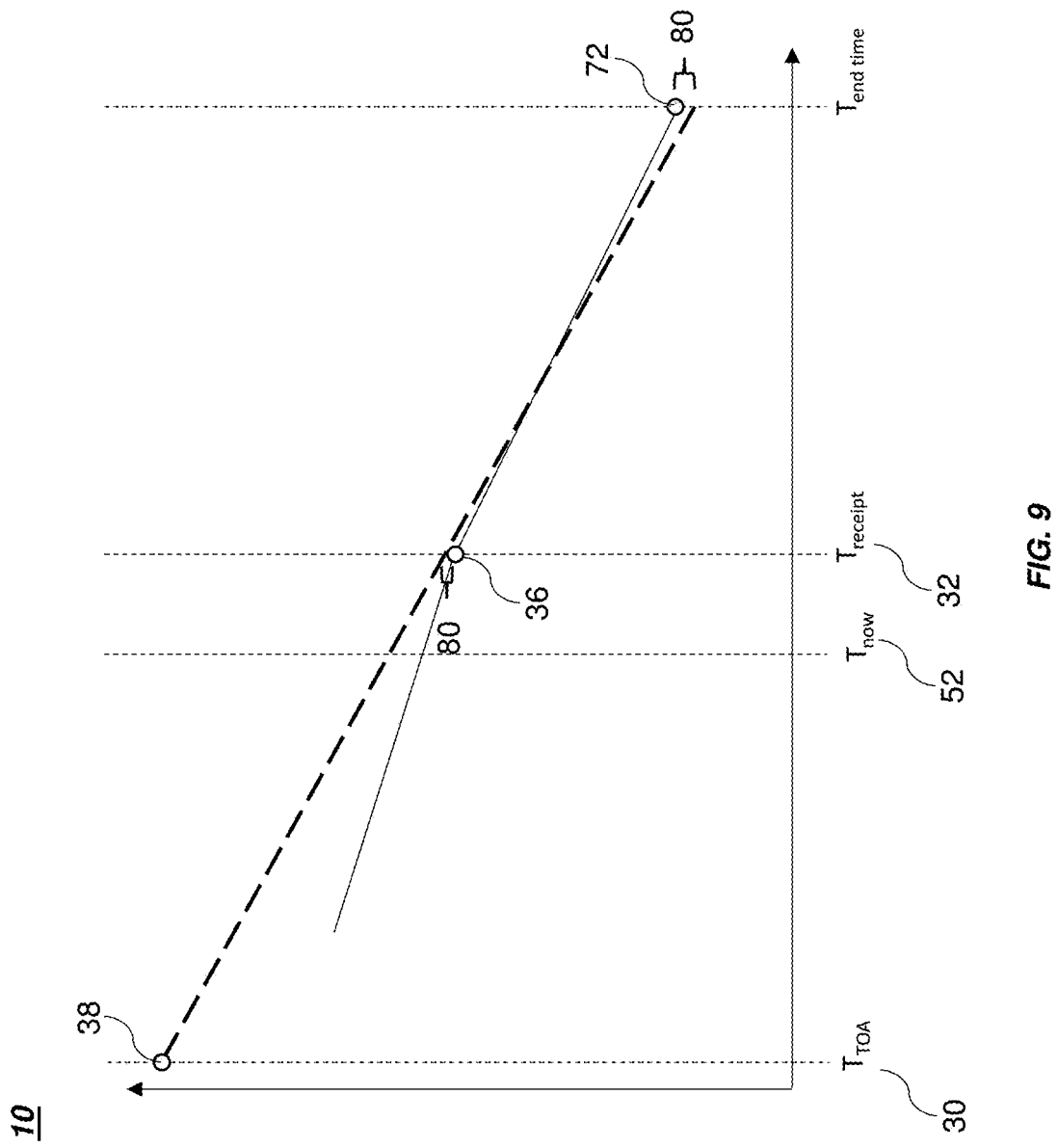
FIG. 9 is an exemplary plot showing quantization error.

Because the correction data 28 is quantized, there may be a quantization error caused by the quantization. The quantization error may be the difference between the non-quantized correction data 28 and the quantized correction data. The quantization error is visible in FIG. 9. In FIG. 9, the desired correction is shown as a solid line, while the quantized correction is shown as a dashed line. The difference between the desired correction and the quantized correction may be due solely to the changes in the correction data 28 caused by quantization.

In the embodiment shown in FIG. 9, the correction data 28 may be approximated using a linear fit. That is, the correction data 28 may include a drift (e.g., a slope of a line) and an offset (e.g., the starting point of the line of the correction data 28). For example, both the orbit correction and the clock correction may include a drift and an offset. The desired correction at the receipt time 36 and the desired correction at the end time 72 may be calculated by differencing the calculated location 24 and the assumed location 22. The quantized correction offset 38 and the quantized correction drift (ie. the slope of the dashed line) may be chosen to minimize the difference between the desired correction and the quantized correction between the time of receipt and the end time.

The quantization error 80 may be calculated (e.g., by the circuitry 50) by determining a difference between the set of the correction data and the set of the correction data after being quantized. An exemplary quantization error 80 is shown in FIG. 9. The set of the correction data 28 may not be output when the quantization error 80 is greater than a quantization error threshold.

The quantization error 80 may be based on a summation of a difference between the clock correction of the set of the correction data and the clock correction of the set of the correction data after being quantized, and a difference between the orbit correction of the set of the correction data and the orbit correction of the set of the correction data after being quantized. That is, the quantization error 80 may be based on the error caused by quantization in the clock correction and in the orbit correction.

In one embodiment as described above, it is attempted to maintain a continuity of the sets of correction data across updates. However, there is no way to guarantee continuity because 1) the user will use the correction data the second it is received regardless of the TOA and 2) the TOA may be quantized to 16 seconds of resolution meaning the TOA may generally not match the time a correction is received. To minimize the effect of quantization, the TOA is set $TOA_{Delay}$ seconds in the past minimizing the effect of quantization on the correction at the time the correction is received.

The Clock Correction and each XYZ element of the Orbit Correction along with the corresponding drift terms may be set using the following routine. The inputs may include:

$T_{TOA}$, the TOA of the message $(x_1, y_1)$ and $(x_2, y_2)$, two points (time, value), selected for the correction to pass through. $x_1$ corresponds with the time of receipt of the message. $x_2$ is a future time.

$C_{LSB}$, $C_{max}$, $C_{min}$, the correction term LSB and message limits $D_{LSB}$, $D_{max}$, $D_{min}$, the drift term LSB and message limits The outputs may include C, the correction D, the drift The unquantized slope may be started within between the two points and $C_1$ may be chosen such that $(T_{TOA}, C_1)$ is on the line through $(x_1, y_1)$ and $(x_2, y_2)$.

$$m = \frac{y_2 - y_1}{x_2 - x_1}$$

$$C_1 = y_2 - m(x_2 - T_{TOA})$$

Round $C_1$ to the least significant bit (LSB) in the message $$C_2 = C_{LSB} \times \text{Round}\left(\frac{C_1}{C_{LSB}}\right)$$

Constrain $C_2$ to the message limits $$C = \max(\min(C_2, C_{max}), C_{min})$$

The Drift is the slope through the points $(T_{TOA}, C)$ and $(x_2, y_2)$. After quantization it should pass very close to both $(x_1, y_1)$ and $(x_2, y_2)$.

$$D_1 = \frac{y_1 - C}{x_1 - T_{TOA}}$$

$$D_2 = D_{LSB} \times \text{Round}\left(\frac{D_1}{D_{LSB}}\right)$$

$$D = \max(\min(D_2, D_{max}), D_{min})$$

Output C, the correction and D the Drift

Figure 10:
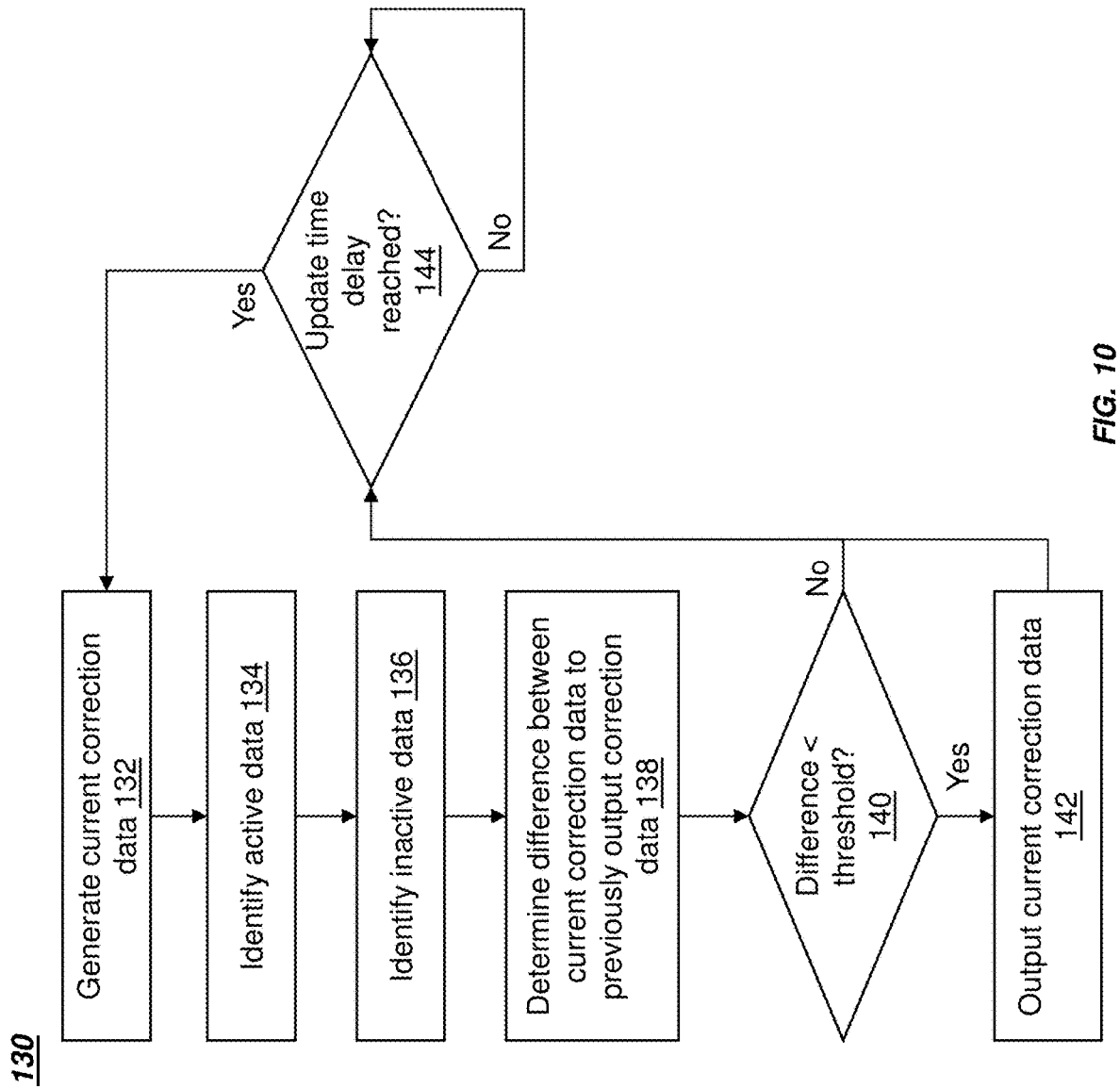
FIG. 10 is a block diagram of a method performed using circuitry for periodically providing corrections for a GNSS.

In the embodiment shown in FIG. 10, a method 130 (e.g., performed using the circuitry 50) is shown for periodically providing corrections to enhance the GNSS 10. In process block 132, the correction data is generated as described in method 100. In process block 134, each of the sets of the correction data (i.e., the correction data that has previously been output) that have a TOA within an active time duration are identified as active data. Similarly, in process block 136, each of the sets of the correction data that have a TOA outside of the active time duration are identified as inactive data. In process block 138, the difference between the current set of correction data and the active data is determined.

In decision block 140, the difference is compared to a correction data difference threshold. If the difference is less than the threshold, then processing moves to process block 142. In process block 142, the current set of correction data is output and processing continues to decision block 144. Conversely, when the difference is greater or equal to the threshold in decision block 140, then the current correction data is not output and processing moves to decision block 144.

In decision block 144, a check is performed to determine if it is time to determine the next set of correction data 132. That is, a time delay occurs between the generation of each of the sets of the correction data 28 and the time delay is based on an update time delay. For example, the update time delay may be 36 seconds. If it is time to generate the next set of correction data 28, then processing returns to process block 132.

As described above, the correction data may include clock corrections.

In one embodiment, a time history of clock error estimates is stored every second. $x_1 = T_{receipt}$, $x_2 = T_{endtime}$. The method of least squares is used on the time history of clock error estimates to compute the extrapolated clock correction $y_2$ at time $x_2$. If a previous correction has been broadcast by the satellite it is used to computed $y_1$ at time $x_1$. If a previous correction is not available then the method of least squares is used on the time history of clock error estimates to compute the clock correction $y_1$ at time $x_1$. Using $(x_1,y_1)$ and $(x_2,y_2)$ the method of [0040] to [0045] is used to compute the clock correction offset, $\delta B_G$ and drift, $\delta B_{G,ROC}$.

Calculate the clock error at the end of the interval from quantization and truncation:

$$\Delta \text{Clk} = |y_2 - (\delta B_G + (x_2 - T_{TOA})\delta B_{G,ROC})|$$

Orbit corrections may be computed for each satellite. If $DFOP_{Prev}$ (the last received broadcast DFOP data) exists (DFOP Data exists if Current Time $- T_{receipt} \leq I_{Valid,MT32}$)

$$x_{orbit} = \delta x_B + (T_{Receipt} - t_B) * \delta x_{B,roc} + EPH_x$$

$$y_{orbit} = \delta y_B + (T_{Receipt} - t_B) * \delta y_{B,roc} + EPH_y$$

$$z_{orbit} = \delta z_B + (T_{Receipt} - t_B) * \delta z_{B,roc} + EPH_z$$

where $t_B$, $\delta xyz_B$, $\delta xyz_{B,roc}$ and $t_o$ come from $DFOP_{Prev}$ otherwise $$xyz_{orbit} = Q^T r_{sk} - EPH_{C,xyz}$$

where $r_{sk}$ is the ECEF Position of the satellite at calculated at $T_{receipt}$ in inertial coordinates and $Q^T$ is the transpose of ECEF to Inertial transformation matrix and $EPH_{C,xyz}$ is the ECEF location of the satellite as computed with the current ephemeris.

$r_{sk}$ may be extrapolated forward to a time of interest by integrating the orbit states from a Kalman Filter.

Set $Pt_{1,x} = (T_{receipt}, X_{orbit})$

Set $Pt_{1,y} = (T_{receipt}, y_{orbit})$

Set $Pt_{1,z} = (T_{receipt}, x_{orbit})$ $$xyz_{future} = Q^T r_{sk} - EPH_{C,xyz}$$

where both $r_{sk}$ and $EPH_{C,xyz}$ are estimated at time $T_{end\ time}$ $T_{end\ time} = T_{receipt} + K\_\text{Computation\_Interval}$ Set $Pt_{2,x} = (T_{end\ time}, X_{end\ time})$ Set $Pt_{2,y} = (T_{end\ time}, y_{end\ time})$ Set $Pt_{2,z} = (T_{end\ time}, z_{end\ time})$ Calculate the orbit corrections ($\delta x_G$, $\delta y_G$, $\delta z_G$) and drift ($\delta x_{G,ROC}$, $\delta y_{G,ROC}$, $\delta z_{G,ROC}$) using the methods described in [0040] to [0045].

$\delta x_G$ and $\delta x_{G,ROC}$ is computed with $Pt_{1,x}$ and $Pt_{2,x}$, $\delta y_G$ and $\delta y_{G,ROC}$ is computed with $Pt_{1,y}$ and $Pt_{2,y}$, $\delta z_G$ and $\delta z_{G,ROC}$ is computed with $Pt_{1,z}$ and $Pt_{2,z}$, Calculate the orbit error at the end of the interval from quantization and truncation:

$$\Delta \text{orbit}_x = |x_{end\ time} - (\delta x_G + (T_{end\ time} - T_{TOA})\delta x_{G,ROC})|$$

$$\Delta \text{orbit}_y = |y_{end\ time} - (\delta y_G + (T_{end\ time} - T_{TOA})\delta y_{G,ROC})|$$

$$\Delta \text{orbit}_z = |z_{end\ time} - (\delta z_G + (T_{end\ time} - T_{TOA})\delta z_{G,ROC})|$$

If the following condition exists, correction data is not provided for this satellite this calculation period. No further processing is performed for this satellite.

$$(\Delta \text{Clk}) + \sqrt{\Delta \text{orbit}_x^2 + \Delta \text{orbit}_y^2 + \Delta \text{orbit}_z^2} > K\_\text{Max\_Error}$$

Compare the newly computed correction data with the most recently received correction data at the end of life of the correction. If the 'difference' between the newly computed correction and the old but active correction exceeds a threshold, discard the newly created correction data and wait for the old correction to timeout.

If there is no active data OBAD Avoidance processing is not performed.

In what follows, in one embodiment C refers to the newly created correction, P refers to the active correction (or previous correction) and ephemeris data is computed using the ephemeris which has an IODC which matches the IODN in either the current or previous correction.

$T$ = Time of receipt of $DFOP_{Prev} + I_{Valid,MT32}$ $\Delta t_{C\ or\ P} = T - t_{toc,C\ or\ P}$ $\Delta EPH_{clock} = (a_{f0,C} + a_{f1,C}(\Delta t_C) + a_{f2,C}(\Delta t_C)^2 - t_{GD,C}) - (a_{f0,P} + a_{f1,P}(\Delta t_P) + a_{f2,P}(\Delta t_P)^2 - t_{GD,P})$ $\delta EPH_{xyz} = EPH_C - EPH_P$ (Where Eph is the satellite position computed at T with the ephemeris message which matches the IODN or either the current or previous correction data.)

$\Delta C^{sv} = ((\delta B_C + (T - t_{B,C}) * \delta B_{C,ROC}) - (\delta B_P + (T - t_{B,P})\delta B_{P,ROC}) + c \cdot \delta EPH_{clock})$ ($t_B$ is time of day applicability adjusted for end of day rollover)

$$\Delta \vec{P}^{sv} = \begin{bmatrix} (\delta x_C + (T - t_{B,C})\delta x_{C,ROC}) - \\ (\delta x_P + (T - t_{B,P})\delta x_{P,ROC}) \\ (\delta y_C + (T - t_{B,C})\delta y_{C,ROC}) - \\ (\delta y_P + (T - t_{B,P})\delta x_{P,ROC}) \\ (\delta z_C + (T - t_{B,C})\delta z_{C,ROC}) - \\ (\delta z_P + (T - t_{B,P})\delta z_{P,ROC}) \end{bmatrix} + \delta EPHxyz$$

$$\vec{r}_{sv} = \frac{\vec{R}^{sat}}{\|\vec{R}^{sat}\|}$$

where $R^{sat}$ is computed at time T with the current ephemeris.

$$\Delta R^{sv} = \vec{P}^{sv} \cdot \vec{r}_{sv}$$

$$\Delta H^{sv} = \|\Delta \vec{P}^{sv} - \Delta R^{sv} \vec{r}_{sv}\|$$

$$c_1 = \frac{1}{2}\left(\frac{R^e}{R^{sv}}\right)^2$$

$$c_2 = \frac{R^e}{R^{sv}}$$

$R_e$ is the radius of the earth and $R^{sv}$ is the radius of the GNSS satellite orbit.

If the following condition exists, correction data is not provided for this GEO/satellite this calculation period.

$$|\Delta C^{sv} - \Delta R^{sv}| + c_1|\Delta R^{sv}| + c_2|\Delta H^{sv}| > K\_Max\_OBAD$$

Otherwise

Correction data is output.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method performed using circuitry for providing corrections for a Global Navigation Satellite System (GNSS), the method comprising:

receiving an assumed location of a Global Navigation Satellite System (GNSS) satellite including both time and position data;

calculating the actual location of the GNSS satellite including both time and position data;

generating a set of correction data based on an error between the assumed location and the calculated location of the GNSS satellite including:

setting a time of applicability (TOA) of the set of the correction data;

estimating a receipt time of the set of the correction data by a user;

determining a projected assumed location of the GNSS satellite at the receipt time;

determining a projected calculated location of the GNSS satellite at the receipt time; and determining the set of the correction data, such that the error is minimized when the set of the correction data is quantized and applied to the projected assumed location at the receipt time to generate a projected corrected location at the receipt time;

wherein the location error is based on a difference between the projected corrected location at the receipt time and the projected calculated location at the receipt time; and outputting the set of the correction data.

2. The method of claim 1, further comprising:

determining an end time of the set of the correction data;

determining a projected assumed location of the GNSS satellite at the end time; and determining a projected calculated location of the GNSS satellite at the end time;

determining a projected corrected location at the end time by quantizing the set of the correction data and applying the quantized set of the correction data to the projected assumed location at the end time;

wherein the error is also based on a difference between the projected corrected location at the end time and the projected calculated location at the end time.

3. The method of claim 1:

wherein the set of the correction data includes an orbit correction and a clock correction;

wherein both the orbit correction and the clock correction are quantized and have a limited resolution;

wherein the projected assumed location at the receipt time, the projected assumed location at the TOA, the projected calculated location at the receipt time, and the projected corrected location at the receipt time each include both time and position data.

4. The method of claim 3, wherein both the orbit correction and the clock correction include a drift and an offset, and the correction is calculated by:

generating a quantized correction offset that minimizes the difference between the desired correction the quantized correction between the time of receipt and the end time; and generating a quantized correction drift that minimizes the difference between the desired correction the quantized correction between the time of receipt and the end time.

5. The method of claim 3, wherein the orbit correction includes an x correction, a y correction, and a z correction.

6. The method of claim 1, further comprising calculating a quantization error including determining a difference between the set of the correction data and the set of the correction data after being quantized, wherein the set of the correction data is not output when the quantization error is greater than a quantization error threshold.

7. The method of claim 6, wherein the quantization error is based on a summation of a difference between the clock correction of the set of the correction data and the clock correction of the set of the correction data after being quantized, and a difference between the orbit correction of the set of the correction data and the orbit correction of the set of the correction data after being quantized.

8. A method performed using circuitry for periodically providing corrections to enhance a Global Navigation Satellite System (GNSS), the method comprising:
generating and outputting multiple sets of the correction data, by repeatedly performing the method of claim 1 to generate and output a set of the correction data, such that a time delay occurs between the generation of each of the multiple sets of the correction data and the time delay is based on an update time delay;
identifying as active data each of the multiple sets of the correction data of the multiple sets that have a TOA within an active time duration;
identifying as inactive data each of the multiple sets of the correction data of the multiple sets that have a TOA outside of the active time duration;
after generating and outputting the multiple sets of correction data, performing the method of claim 1 to generate a set of correction data as a current set of correction data; and
comparing the current set of correction data to the active data such that:
when a difference between the current set of correction data and each of the sets of correction data of the active data is less than a correction data difference, outputting the current set of correction data; and
when a difference between the current set of correction data and any of the sets of the correction data of the active data is greater than a correction data difference, not outputting the current set of correction data.

9. An electronic device for providing correction data to enhance a Global Navigation Satellite System (GNSS), the electronic device comprising:
a communication interface configured to:
receive an assumed location of a Global Navigation Satellite System (GNSS) satellite including both time and position data;
computing an actual location of the GNSS satellite, wherein the actual location includes both time and position data;
circuitry configured to:
generate a set of correction data based on an error between the assumed location and the actual location of the GNSS satellite including:
setting a time of applicability (TOA) of the set of the correction data;
estimating a receipt time of the set of the correction data by a user;
determining a projected assumed location of the GNSS satellite at the receipt time;
determining a projected calculated location of the GNSS satellite at the receipt time; and
determining the set of the correction data, such that the error is minimized when the set of the correction data is quantized and applied to the projected assumed location at the receipt time to generate a projected corrected location at the receipt time;
wherein the error is based on a difference between the projected corrected location at the receipt time and the projected calculated location at the receipt time; and
outputting the set of the correction data.

10. The electronic device of claim 9, wherein the circuitry is further configured to:
determine an end time of the set of the correction data;
determine a receipt time of the set of the correction data;
determine the desired correction at the end time by differencing the calculated location and the assumed location;
determine the desired correction at the receipt time by differencing the calculated location and the assumed location; and
determine the correction to minimize the difference between the desired correction and the quantized correction between the receipt time and the end time.

11. The electronic device of claim 9:
wherein the set of the correction data includes an orbit correction and a clock correction;
wherein both the orbit correction and the clock correction are quantized and have a limited resolution;
wherein the projected assumed location at the receipt time, the projected assumed location at the TOA, the projected calculated location at the receipt time, and the projected corrected location at the receipt time each include both time and position data.

12. The electronic device of claim 11, wherein the orbit correction includes an x correction, a y correction, and a z correction.

13. The electronic device of claim 9, wherein the circuitry is further configured to calculate a quantization error including determining a difference between the set of the correction data and the set of the correction data after being quantized, wherein the set of the correction data is not output when the quantization error is greater than a quantization error threshold.

14. The electronic device of claim 13, wherein the quantization error is based on a summation of a difference between the clock correction of the set of the correction data and the clock correction of the set of the correction data after being quantized, and a difference between the orbit correction of the set of the correction data and the orbit correction of the set of the correction data after being quantized.

15. The electronic device of claim 9, wherein the circuitry is further configured to:
generate and output multiple sets of the correction data, by repeatedly performing the generation and the output of a set of the correction data, such that a time delay occurs between the generation of each of the multiple sets of the correction data and the time delay is based on an update time delay;
identify as active data each of the multiple sets of the correction data that has previously been output and that has a TOA within an active time duration;
identify as inactive data each of the multiple sets of the correction data that has previously been output and that has a TOA outside of the active time duration;
after generating and outputting the multiple sets of correction data, generate a set of correction data as a current set of correction data; and
compare the current set of correction data to the active data such that:
when a difference between the current set of correction data and each of the sets of correction data of the active data is less than a correction data difference, outputting the current set of correction data; and
when a difference between the current set of correction data and any of the sets of correction data of the active data is greater than a correction data difference, not outputting the current set of correction data.

16. A Satellite Based Augmentation System comprising:

Global Navigation Satellite System (GNSS) satellites configured to range and location data;

reference stations configured to:

receive the location data;

compute the range to the GNSS satellite;

an electronic device configured to:

determine a calculated location of the GNSS satellites based on the range data, wherein the calculated location includes both time and position data;

receive the assumed location of the GNSS satellites;

for each of the GNSS satellites, generate a set of correction data based on an error between the assumed location and the actual location of the GNSS satellite including:

setting a time of applicability (TOA) of the set of the correction data;

estimating a receipt time of the set of the correction data by a user;

determining a projected assumed location of the GNSS satellite at the receipt time;

determining a projected calculated location of the GNSS satellite at the receipt time; and determining the set of the correction data, such that the error is minimized when the set of the correction data is quantized and applied to the projected assumed location at the receipt time to generate a projected corrected location at the receipt time;

wherein the error is based on a difference between the projected corrected location at the receipt time and the projected calculated location at the receipt time.

17. The GNSS of claim 16, further comprising a correction satellite configured to output the set of the correction data for each of the GNSS satellites.

18. The GNSS of claim 16:

wherein the set of the correction data includes an orbit correction and a clock correction;

wherein both the orbit correction and the clock correction are quantized and have a limited resolution;

wherein the projected assumed location at the receipt time, the projected assumed location at the TOA, the projected calculated location at the receipt time, and the projected corrected location at the receipt time each include both time and position data.

19. The GNSS of claim 16, wherein the electronic device is further configured to calculate a quantization error including determining a difference between the set of the correction data and the set of the correction data after being quantized, wherein the set of the correction data is not output when the quantization error is greater than a quantization error threshold.

20. The GNSS of claim 16, wherein the electronic device is further configured to:

generate and output multiple sets of the correction data, by repeatedly performing the generation and the output of a set of the correction data, such that a time delay occurs between the generation of each of the multiple sets of the correction data and the time delay is based on an update time delay;

identify as active data each of the multiple sets of the correction data that has previously been output and that has a TOA within an active time duration;

identify as inactive data each of the multiple sets of the correction data that has previously been output and that has a TOA outside of the active time duration;

after generating and outputting the multiple sets of correction data, generate a set of correction data as a current set of correction data; and compare the current set of correction data to the active data such that:

when a difference between the current set of correction data and each of the sets of correction data of the active data is less than a correction data difference, outputting the current set of correction data; and when a difference between the current set of correction data and any of the sets of correction data of the active data is greater than a correction data difference, not outputting the current set of correction data.

\* \* \* \* \*